(No Model.) 2 Sheets—Sheet 1.

A. J. MOXHAM.
RAILROAD RAIL AND PROCESS OF MAKING THE SAME.

No. 477,690. Patented June 28, 1892.

WITNESSES:
Edward C. Rowland.
Francis V. Reilly.

INVENTOR
A. J. Moxham
BY
ATTORNEY (No Model.) 2 Sheets—Sheet 2.

A. J. MOXHAM.
RAILROAD RAIL AND PROCESS OF MAKING THE SAME.

No. 477,690. Patented June 28, 1892.

WITNESSES:
Edward C. Rowland
Francis J. Reilly

INVENTOR
A. J. Moxham
BY
P. N. Moxham
ATTORNEY

UNITED STATES PATENT OFFICE.

ARTHUR J. MOXHAM, OF JOHNSTOWN, PENNSYLVANIA.

RAILROAD-RAIL AND PROCESS OF MAKING THE SAME.

SPECIFICATION forming part of Letters Patent No. 477,690, dated June 28, 1892.

Application filed March 21, 1892. Serial No. 425,734. (No model.)

*To all whom it may concern:*

Be it known that I, ARTHUR J. MOXHAM, of Johnstown, in the county of Cambria and State of Pennsylvania, have invented a new and useful Railroad-Rail and Process of Making the Same, which invention is fully set forth and illustrated in the following specification and accompanying drawings.

The object of this invention is to facilitate the welding of a base or support to railroad-rails and to strongly weld said parts together.

The invention will first be described in detail, and then particularly set forth in the claims.

Figure 1:
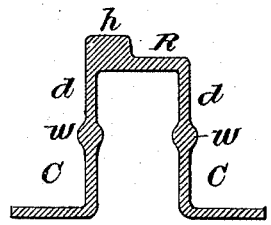
Figure 2:
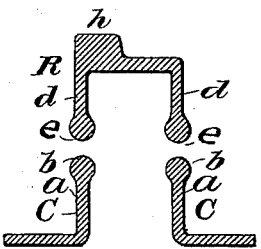
Figure 3:
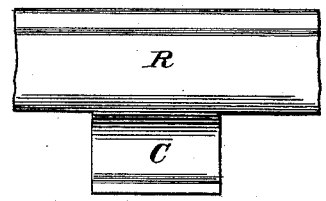
Figure 4:
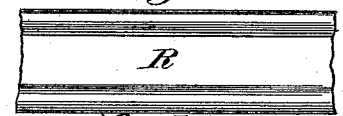
Figure 5:
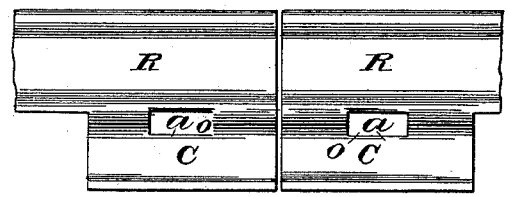
Figure 6:
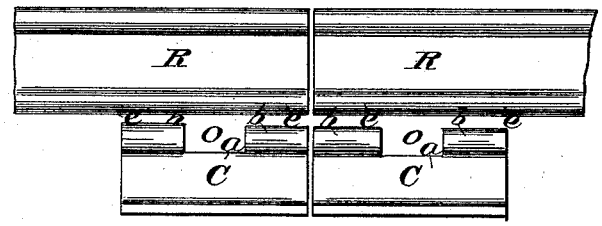
Figure 7:
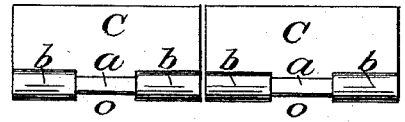
Figure 7:
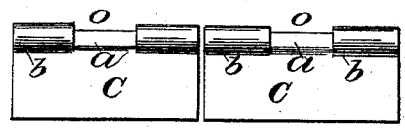
Figure 8:
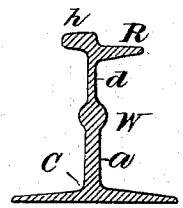
Figure 9:
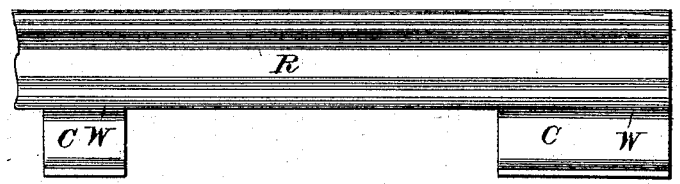
Figure 10:
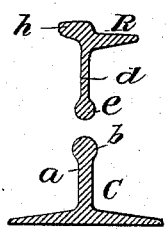
Figure 11:
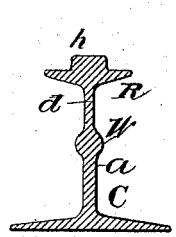
Figure 12:
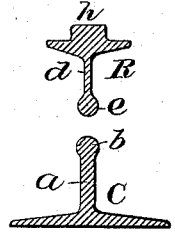
Figure 13:
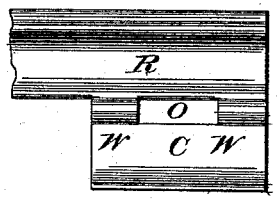
Figure 14:
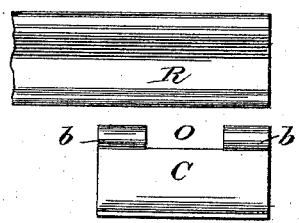
Figure 15:
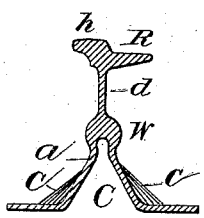
Figure 16:
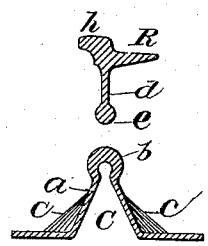
Figure 17:
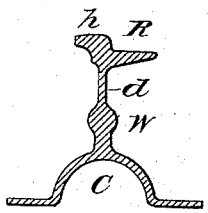
Figure 18:
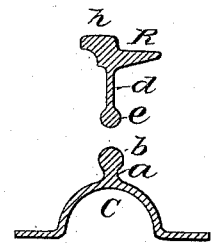
Figure 19:
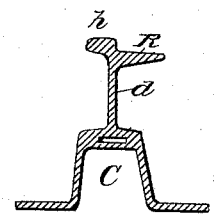
Figure 20:
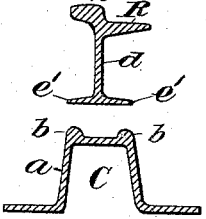

In the accompanying drawings, Figure 1 shows in cross-section one form of rail with its angle feet or supports made by the process herein described. Fig. 2 shows the parts illustrated in Fig. 1 before being united, as hereinafter described. Figs. 3 and 4 are side elevations showing, respectively, the rail and one of its supports after and before being united. Figs. 5 and 6 are side elevations showing the ends of two contiguous rails, each being provided at its end with a support, Fig. 5 showing the rails and supports united and Fig. 6 showing the same separated. Fig. 7 is a view in plan of Fig. 6, the rails being omitted. Fig. 8 is a cross-section of a single-web rail with its support made by the process herein described. Fig. 9 is a side elevation of Fig. 8. Fig. 10 shows in cross-section the parts illustrated in Fig. 8 before being united. Figs. 11 and 12 show in cross-section a modified form of rail and its support after and before being united. Fig. 13 is a side elevation of one end of the rail shown in Fig. 11. Fig. 14 shows the parts of Fig. 13 before being united. Fig. 15 shows in cross-section a modified form of rail and support. Fig. 16 shows the parts illustrated in Fig. 15 before being united. Fig. 17 shows in cross-section a rail having another form of support united thereto. Fig. 18 shows the parts illustrated in Fig. 17 before being united. Fig. 19 shows in cross-section another modification of rail and support. Fig. 20 shows the parts illustrated in Fig. 19 before being united.

In said figures the several parts are respectively indicated by reference-letters, as follows:

My invention is carried out in the following manner: The rail is formed separate from its support, preferably by rolling, and the support is formed separate from the rail and may be formed in any desired manner. I also form a bead or bulb both upon the web of the rail and upon the support. The rail and its support are then welded together at the bead, which forms a good welding-point, a compound rail being formed which has a bead or projection upon the web, which adds strength to the rail and enables the rails to be more perfectly formed one to the other.

In all the drawings, except in Figs. 19 and 20, the rail proper is formed without base-flanges and the bead is formed upon both the rail and support.

In Figs. 19 and 20 the rail proper is formed with base-flanges $e'$, equivalent to a bead, and beads are provided upon the support.

The letter R indicates the rail proper, which may be of any desired form, several forms being shown in the drawings; $h$, its head, and $d$ its vertical web or webs, each of said webs, with the exception of rail shown in Figs. 19 and 20, terminating in a bulb or projection $e$.

The letter C indicates the base or supports for the rail R, which supports may be provided with an upward extension $a$, terminating in a bulb or projection $b$, (although my invention may be used whether or not there be an upward extension to the support.)

As shown in the drawings, the rail is formed throughout with a head and single web, or, as in Figs. 1 to 7, with two webs, while the supports C are provided at intervals only. These supports may be at any desired distance apart or even might be made continuous without departing from my invention, except wherein the supports at intervals are specifically claimed. Where a rail of box form having two webs, such as shown in Figs. 1 and 2, is used, angle feet or supports may be united to each of said webs.

The supports C may be of any desired form, a number of forms being shown in the drawings, and they may be produced by any method or process, such as rolling, forging, casting, or otherwise, or some may be made by one method or process and some by another. Preferably, however, both the rails and supports are made of rolled steel. When the supports are rolled in long lengths, they are cut up to the lengths required.

The process of making the complete rail is as follows: The rail and supports having been separately formed into the desired shapes, as above described, said supports are abutted to the rail at any desired distance apart, and the bulb portions or bead portions *e b* are then welded together by any suitable method, process, means, or act of welding, the letter W indicating the single bead or bulb formed by such welding. By providing the rails and supports with the beads or bulbs, as shown, an easier and more perfect weld is accomplished than if said bulbs were not present, and when said parts are provided with bulbs and these bulbs are welded together the deep webs of the rails are strengthened and stiffened by the bead formation W of greater area than the rest of said web. The exact shape of said beads or bulbs is not material.

As all welding increases in cost and difficulty in proportion to the area welded, it will be economical where very long supports are used—such as shown at the ends of the rails in Figs. 5, 6, 7, 13, and 14—to cut away a portion of the supports, as indicated at the point *o*, leaving sufficient metal in contact to secure the desirable strength of weld. Instead, however, of removing a portion of the support a portion of the web of the rail might be cut away, if desired.

Braces *c* may be stamped out of the supports C, as shown in Figs. 15 and 16, for purposes of strength, if desired.

By the process herein described by forming a rail and its base or supports separately with a bulb on both and then welding the two parts together, so as to form an integral structure, a rail of great depth strongly welded is obtained which when delivered from the shop is ready to be secured in place in the track without the intervention of any detachable supports.

Having thus fully described my invention, I claim—

1. The process of making an improved railroad-rail and support, which consists in forming a rail provided with a head and web and a bulb or projection upon said web and welding to said web a base or support also provided with a bulb or projection, the point of welding being at the point of contact of the two bulbs.

2. The process of making an improved railroad-rail and support, which consists in forming a rail provided with a head and double web throughout its length and bulbs or projections upon each of said webs and welding to said webs a base or support also provided with bulbs or projections, the points of welding being at the points of contact of said bulbs.

3. The process of making an improved railroad-rail and support, which consists in rolling a rail provided with a head and double web throughout its length and bulbs or projections upon each of said webs and welding to said webs a base or support also provided with bulbs or projections, the points of welding being at the points of contact of said bulbs.

4. The process of making an improved railroad-rail, which consists in forming a rail with a head and web and abutting and welding to said web a base or support, a portion of one of said abutting surfaces being cut away, as described.

5. The process of making an improved railroad-rail, which consists in forming a rail provided with a head and web and a bulb or projection upon said web and welding to said web a base or support also provided with a bulb or projection, a portion of one of said bulbs being cut away, as described, and the point of welding being at the point of contact of the two bulbs.

6. A railroad-rail provided with a head and web, the web terminating in a bulb, and a base or support having a bulb, the two bulbs being welded together.

7. A railroad-rail provided with a rolled head and web, the web terminating in a bulb, and a base or support also having a bulb, the two bulbs being welded together.

8. A railroad-rail provided with a head and double web throughout its length, each web terminating in a bulb, and with a base or support also having bulbs, said bulbs being welded together.

9. A railroad-rail provided with a rolled head and double web throughout its length, each web terminating in a bulb, and with a base or support also having bulbs, said bulbs being welded together.

10. A railroad-rail provided with a head and web and having abutted and welded to said web a base or support, a portion of one of said abutting surfaces being cut away, as described.

11. A railroad-rail provided with a head and web, the web terminating in a bulb, and a base or support also having a bulb, a portion of one of said bulbs being cut away, as described, and the two bulbs being welded together.

ARTHUR J. MOXHAM.

Witnesses:
WM. A. DONALDSON,
A. J. BRYAN.